United States Patent [19]
Mogilnicki et al.

[11] Patent Number: 5,263,995
[45] Date of Patent: Nov. 23, 1993

[54] APPARATUS AND METHOD FOR BALANCING A ROTARY TOOL ASSEMBLY

[75] Inventors: Victor D. Mogilnicki; Thomas J. Presby, both of Raleigh, N.C.

[73] Assignee: Kennametal Inc., Latrobe, Pa.

[21] Appl. No.: 10,096

[22] Filed: Jan. 27, 1993

[51] Int. Cl.$^5$ .............................................. B23C 9/00
[52] U.S. Cl. ........................................ 409/131; 51/169; 74/573 R; 408/143; 409/141
[58] Field of Search ............ 409/131, 141, 234; 408/143; 74/573 R; 51/169; 82/903

[56] References Cited

U.S. PATENT DOCUMENTS

| | | | |
|---|---|---|---|
| 1,645,343 | 10/1927 | Moorhouse | 74/573 R |
| 2,241,637 | 5/1941 | Ernst et al. | 51/169 X |
| 2,861,471 | 11/1958 | Kronenberg | 74/573 R |
| 3,528,316 | 9/1970 | Hammer | 74/573 R |
| 4,626,144 | 12/1986 | Berner | 408/143 |
| 4,865,336 | 9/1989 | Keritsis | 409/234 X |
| 4,951,526 | 8/1990 | Linder | 74/573 R |
| 5,074,723 | 12/1991 | Massa et al. | 409/131 |
| 5,154,554 | 10/1992 | Ariyoshi | 409/141 |

FOREIGN PATENT DOCUMENTS

| | | | |
|---|---|---|---|
| 2134270 | 7/1971 | Fed. Rep. of Germany | 51/169 |
| 1456797 | 2/1989 | U.S.S.R. | 74/573 R |

*Primary Examiner*—William Briggs
*Attorney, Agent, or Firm*—James G. Porcelli

[57] ABSTRACT

An apparatus and method for balancing a high speed rotary tool assembly (1) is provided, wherein the apparatus includes a rotary tool holder (3) having an axis of rotation (11), a cutting tool retainer (13) in the rotary tool holder (3) having a lockring (23) that circumscribes the axis of rotation (11) of the holder (3), and a pair of axially spaced balancing rings (35a, 35b) for balancing the entire rotary tool assembly (1) which are rotatably mounted around bearing surfaces (37) circumscribing the lockring (23) so as to be angularly positionable around the axis of rotation (11) of the tool holder (3). In the method of the invention, the unbalance of the tool holder (3) and cutting tool (17) is first determined, and then the rings (35a, 35b) are rotatably adjusted about the bearing surface (11) on the lockring (23) to create an unbalance which cancels out the determined unbalance of the tool holder (3) and cutting tool. The balancing rings (35a, 35b) are then secured in the unbalanced-neutralizing position by means of set screws (50). The positioning of the balancing rings (35a, 35b) on an existing lockring (23) of the assembly (1) advantageously allows the apparatus of the invention to be easily retrofitted onto a standard rotary tool holder with a minimum amount of machining and parts.

28 Claims, 3 Drawing Sheets

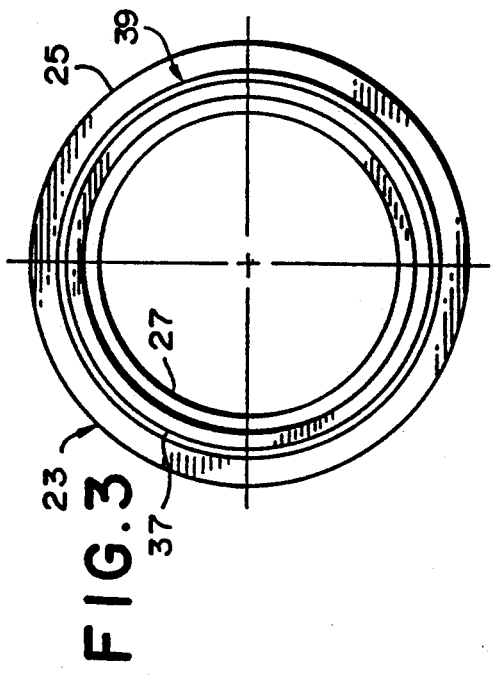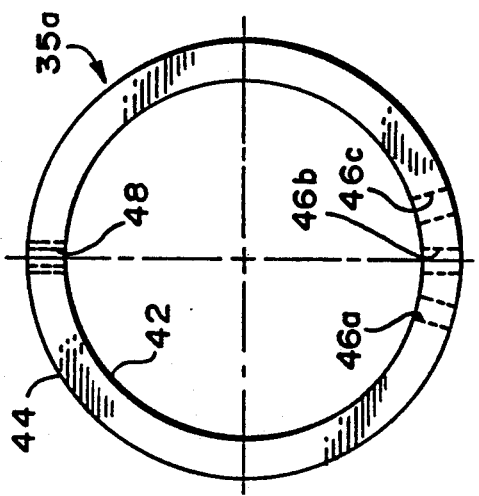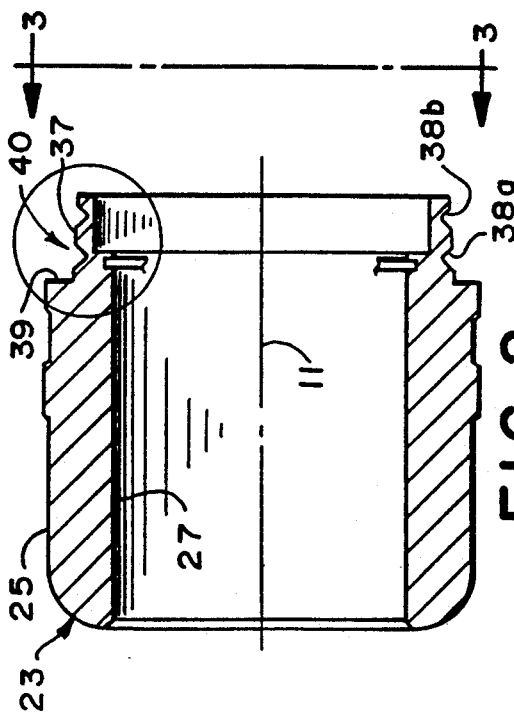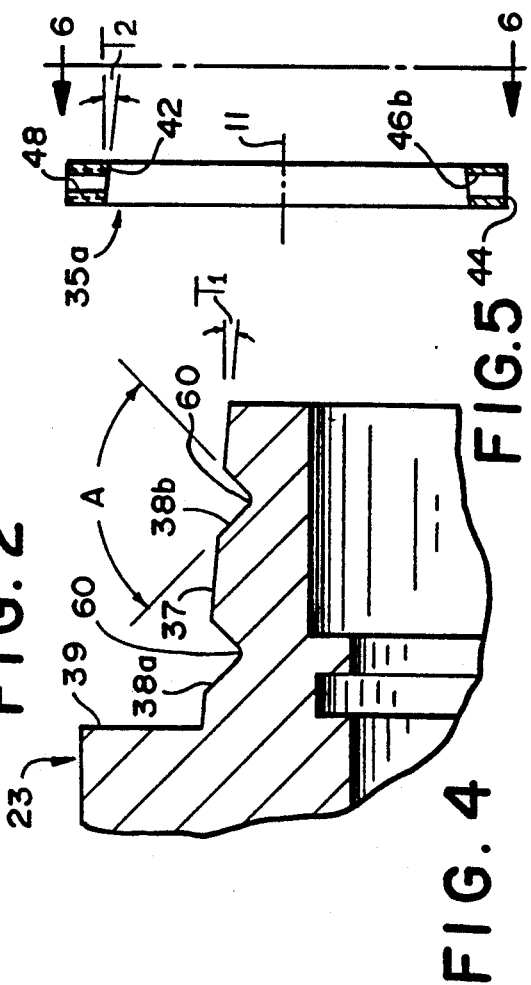

APPARATUS AND METHOD FOR BALANCING A ROTARY TOOL ASSEMBLY

BACKGROUND OF THE INVENTION

This invention generally relates to rotary tool assemblies of the type including a tool holder, a cutting tool retainer, and a lockring, and is specifically concerned with an apparatus and method for balancing such a rotary tool assembly by means of a pair of balancing rings rotatably mounted around the circumference of the lockring.

Mechanisms for balancing rotary tool holder assemblies are known in the prior art. Many of such tool holder assemblies are capable of operating at speeds above 12,000 rpm. Without a balancing mechanism, the smooth and accurate operation of the cutting tool held by such a rotary tool assembly would be greatly impaired, as the centrifugal forces created within an unbalanced, high speed tool holder can cause the cutting tool to vibrate, which in turn results in an uneven cutting action as well as stresses in the tool which can result in premature wear or even failure.

The operation of such prior art balancing mechanisms usually involves the two steps of measuring the amount of unbalance in the rotary tool assembly after a cutting tool has been mounted therein, and then moving the position of a mass in the balancing mechanism to neutralize the unbalance in the tool holder. Unfortunately, there are a number of shortcomings associated with all such prior art designs. For example, in one prior art balancing mechanism, three or more radially oriented screws are screwed either inwardly or outwardly with respect to the axis of rotation of the tool holder in order to achieve balance. While this mechanism is generally capable of achieving its intended function, its operation is often tedious and difficult as the various screws making up the mechanism have to be precision turned different amounts. This mechanism is also limited in the amount of unbalance it can correct without the addition of more screws which would make the adjustment operation even more complicated and tedious. In another type of mechanism, cooperating open-type rings are rotated about the axis of a rotating tool holder in order to achieve a tool balance. Such a mechanism is disclosed and claimed in U.S. Pat. No. 4,626,144. However, the balancing rings used in this mechanism are mechanically linked together and cannot be moved or adjusted independently, thereby limiting the versatility of the mechanism. Additionally, this particular prior art balancing mechanism is relatively complicated and hence expensive to manufacture.

One of the most recent and substantial advances in the balancing mechanism art comprises a pair of independently rotatable balancing rings mounted on bearing surfaces that circumscribe the cylindrical exterior of the tool holder of a rotary tool assembly. This balancing mechanism is disclosed and claimed in U.S. Pat. No. 5,074,723, assigned to Kennametal Inc. However, the applicants have observed a number of areas in which even this mechanism might be improved. For example, in order for the tool holder of the tool assembly to accommodate the balancing rings, the body of the tool holder must be made longer along its axis of rotation, and further must include not only a pair of circumscribing bearing surfaces for rotatably mounting the bearing rings, but a retaining ring as well for securing the balancing rings to the housing of the tool holder. Thus the tool holder component of the tool assembly must be custom made to accommodate the balancing mechanism. The necessity of providing a specially dimensioned and machined tool holder to accommodate the balancing mechanism causes the resulting, balanceable rotary tool assembly to be more expensive than it would be if the balancing mechanism could be installed in an existing tool assembly without the need for replacing the tool holder or any of the other components of the assembly.

Clearly, there is a need for an improved balancing-ring type mechanism that can be installed in a rotary tool assembly without the need for a specially made tool holder. Ideally, such a balancing ring mechanism could be quickly and inexpensively installed on an existing conventional rotary tool assembly without the need for specially manufacturing any of the major components of the assembly, and with only a minimum amount of machining on existing, conventional parts of the assembly.

OBJECTS AND SUMMARY OF THE INVENTION

It is an object of the present invention to provide a balancing mechanism that can be easily installed on an existing component of a rotary tool assembly with a minimum amount of machining and the addition of a minimum number of parts.

It is a further object of the invention to provide a balancing mechanism that can be integrally retrofitted onto an existing component of a rotary tool assembly without significantly changing the overall shape of the assembly, and without exceeding standard ANSI or ISO tool envelope requirements.

Still a further object of the present invention resides in the provision of a balancing mechanism for a rotary cutting tool assembly wherein the balancing mechanism provides a positive retention of the balancing elements incorporated into the balancing mechanism without the need for retaining rings or other special parts.

Another object of the present invention resides in the provision of a balancing mechanism for a rotary cutting tool assembly that can be manufactured at a relatively low cost.

A further object of the present invention resides in the provision of a rotary cutting tool balancing system of the character referred to above wherein the balancing rings are so designed such that respective rings can be easily manufactured such that they possess equal and symmetrical unbalance.

It is also an object of the present invention to provide a balancing system for a rotary tool assembly that can be easily and precisely adjusted to counter the unbalance of an associated tool holder and a certain cutting tool secured within the tool holder.

It is also an object of the present invention to provide a balancing mechanism for a rotary tool assembly that has a neat, clean and noncluttered appearance when incorporated into the tool assembly.

It is also a further object to the present invention to provide a balancing mechanism for a rotary cutting tool wherein the balancing rings provide for quiet operation.

Generally speaking, the invention is a rotary tool assembly and method that overcomes the shortcomings associated with the prior art, and fulfills the aforementioned objects. The tool assembly of the invention comprises a rotary tool holder having an axis of rotation, a means for retaining a cutting tool in said holder, such as a lockring that circumscribes the holder around its axis of rotation and which is detachably connectable thereto, a pair of balancing rings for balancing the entire rotary tool assembly, wherein the rings are rotatably mounted around a portion of the outer surface of the lockring so as to be manually angularly positionable around the axis of rotation of the tool holder, and a means for securing the balancing rings at a desired angular position with respect to the axis of rotation of the tool holder.

The installation of the balancing mechanism on a convention lockring of an existing tool holder assembly not only obviates the need for a custom made tool holder, which is required in the design disclosed in U.S. Pat. No. 5,074,723, but only facilitates the retrofitting of the balancing mechanism on an existing tool holder assembly, as the lockring of such assemblies is relatively easier to remove and handle and machine than the relatively larger and heavier tool holder.

The balancing rings are preferably rotatably mounted around a bearing surface that circumscribes the lockring. This surface is preferably frustro-conically shaped, and the balancing rings are slidably movable to a limited degree along the taper of this frustro-conically shaped surface so that they remain freely rotatable around the groove regardless of any radial expansion that the lockring may experience from reactive forces when it is screwed into engagement with the rotary tool holder. To further encourage this slidable movement, the angle of the taper of the frustro-conical bearing surface of the lockring is at least 2°, and preferably between 2° and 7° with respect to the axis of rotation of the tool holder. Additionally, each of the balancing rings includes an inner, annular surface that is frustro-conically tapered at the same angle as the bearing surface of the lockring.

The securing means which secures the balancing rings at a desired angular position with respect to the tool holder includes a combination of a pair of axially-spaced vee-grooves in the frustro-conically shaped bearing surface, and a set screw threadedly engaged in each of the rings having an end extendable into and engageable with one of the grooves. The end of each of these set screws is preferably conically shaped to provide good engagement with a wall of its respective vee-groove despite any sliding, axial movement the rings may make toward the smaller outer diameter of the frustro-conical bearing surface when the lockring is tightened around the end of the tool holder. The capture of the set screws within the vee-grooves advantageously provides a simple, rotatable mounting for the balancing rings that allows them to be manually angularly adjusted around the lockring when the screws are in a slightly loosened state. Thereafter, the screws may be tightened to secure the rings in a desired angular position. The shank of each of the set screws has a compressible portion such that the screws continue to secure their respective balancing rings in their respective vee-grooves despite further radial expansions of the lockring which occurs from centrifugal loading when the tool holder is rotated at high speeds.

The invention further encompasses an improved method for balancing an existing tool holder assembly of the type including a rotary tool holder having an axis of rotation, and a means detachably connectable to the tool holder, such as a lockring, for retaining a cutting tool in the holder. The method of the invention comprises the step of first rotatably mounting a pair of balancing rings around an outside surface of the lockring by providing a bearing surface on the lockring, which may be frustro-conically shaped. In the next step of the method, a cutting tool is installed in the rotary tool holder and secured therein by the lockring. Next, the amount of unbalance in the tool holder assembly is determined by turning the assembly with the cutting tool installed. This unbalance is then neutralized by rotatably positioning the balancing rings until the eccentric masses provided by these rings are in neutralizing opposition to the eccentric mass defined by the combination of the tool holder assembly and cutting tool. In the last step of this method, the balancing rings are secured in the neutralizing position by radially screwing the set screws into frictional engagement with a wall of their respective vee-grooves.

BRIEF DESCRIPTION OF THE SEVERAL FIGURES

FIG. 2 is a side cross-sectional view of the lockring used in the rotary tool assembly of the invention, illustrating the annular recess where the balancing rings of the balancing mechanism are installed;

FIG. 3 is a front view of the lockring illustrated in FIG. 2 along the line 3—3;

FIG. 4 is an enlargement of the area circled in FIG. 2 illustrating the details of the annular recess formed in the lockring for accommodating the balancing rings of balancing mechanism;

FIG. 5 is a side, cross-sectional view of one of the balancing rings of the balancing mechanism;

FIG. 6 is a front view of the balancing ring illustrated in FIG. 5 along the line 6—6;

DETAILED DESCRIPTION OF THE PREFERRED EMBODIMENT

Figure 1:
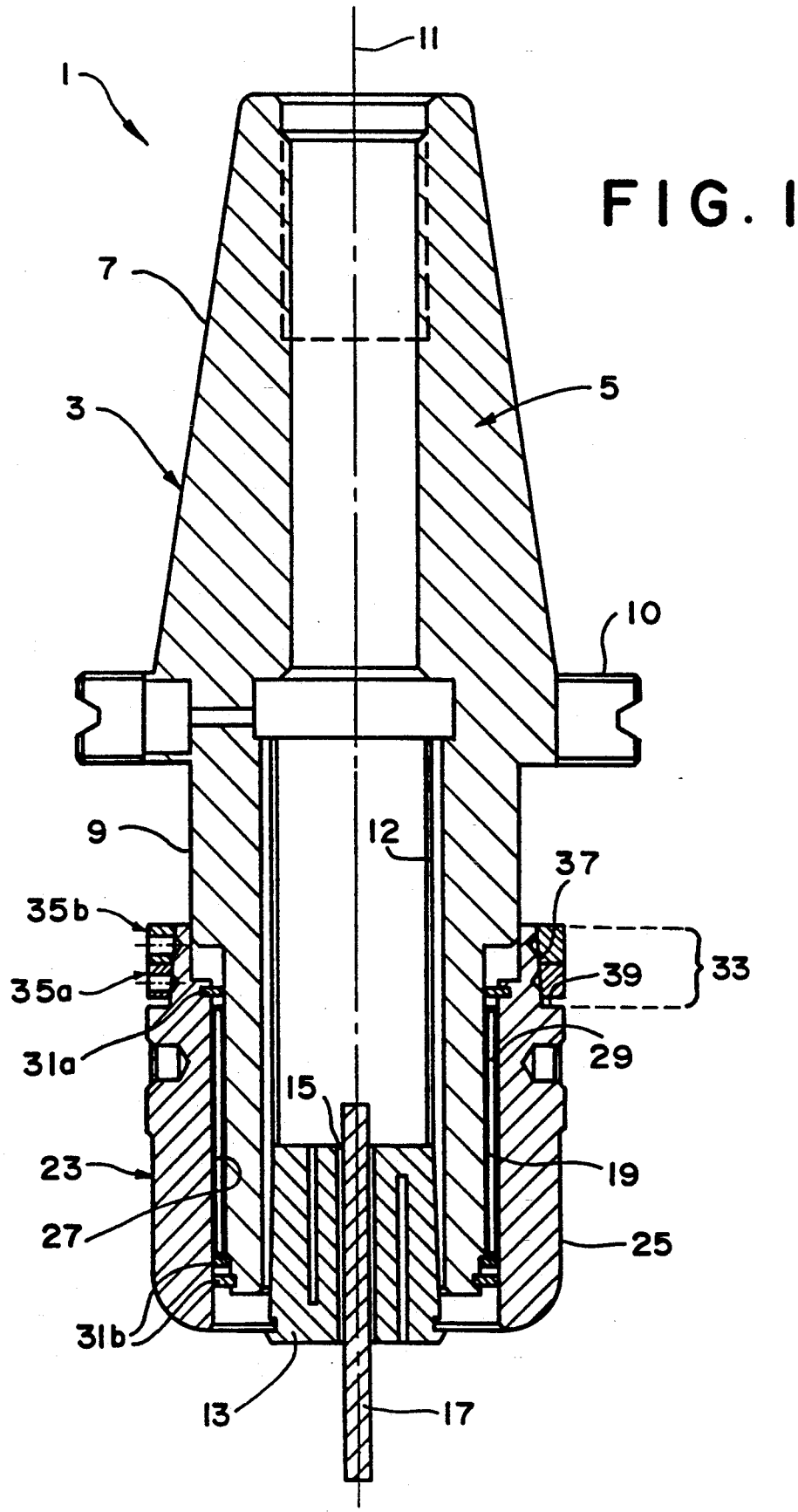
FIG. 1 is a side cross-sectional view of the rotary tool assembly of the invention having a balancing mechanism installed on its lockring.

With respect to FIG. 1, wherein all of the reference numerals present therein designate like components throughout all of the several figures, the rotary tool assembly 1 of the invention generally comprises a tool holder 3 having a detachably connectable lockring 23 for securing a rotatably tool to the holder 3 and a balancing mechanism 33 installed around the lockring 23 for balancing the entire rotary tool assembly 1.

The tool holder 3 may be a conventional rotary tool holder of the type including a steel housing 5 having a conically shaped upper end 7 that is receivable within a rotary drive mechanism (not shown), and a generally cylindrically shaped lower end 9 which receives and secures a rotatable tool. The upper and lower ends 7 and 9 are divided by means of a circular flange 10 which determines the maximum extent to which the conical upper end 7 may be received by the aforementioned rotary drive mechanism. In use, the upper and lower ends 7 and 9 of the housing 5 rotate about the axis 11 as shown. The lower end 9 of the housing 5 includes a centrally disposed bore 12 which terminates at the bottommost portion of the lower end 9 as shown. This bore 12 receives a conventional collet 13 having a centrally disposed recess 15 which in turn holds the shank of a rotatable tool 17, such as a drill. While the outer surface 19 of the lower end 9 of the housing 5 appears to be cylindrical, it is in fact a slightly tapered, frustro-conical surface whose outer diameter diminishes toward the bottom of the housing 5.

With reference now to FIGS. 2, 3, and 4, the lockring 23 of the rotary tool assembly 1 has a generally cylindrical outer surface 25, and a frustro-conical inner surface 27 which is complementary in shape to the frustro-conical surface of the cylindrical lower end 9 of the tool holder housing 5. A plurality of canted rollers 29 (of which only two are visible in FIG. 1) are disposed between the inner surface 27 of the lockring 23, and the outer surface 19 of the lower end 9 of the tool holder housing 5. These rollers 29 are not parallel to the axis of rotation 11 of the rotary tool assembly 1, but instead are canted slightly with respect to this axis 11. Such a canted orientation causes the lockring 23 to advance or retract over the lower end 9 of the tool holder housing 3 when it is turned clockwise or counterclockwise with respect thereto, in screw-like fashion. When the lockring 23 is advanced over the lower end 9 of the tool holder housing 3 in the position illustrated in FIG. 1, it radially compresses the walls of the cylindrical bore 12 inwardly to frictionally engage the tool holding collet 13 such that the rotatable tool 17 is tightly secured to the housing of the tool holder 3.

With reference now to FIGS. 4, 5 and 6, the balancing mechanism 33 includes a pair of balancing rings 35a,b axially spaced in tandem over a bearing surface 37 provided at the upper end of the lockring 23. The bearing surface 37 is in fact a frustro-conical surface having a taper angle T1 between 2° and 7° with respect to the axis of rotation 11 of the lockring 23 for a purpose which will become evident shortly. The bearing surface 37 includes two axially spaced vee-grooves 38a,b for both retaining the balancing rings 35a,b on the lockring 23 and securing them in a desired angular position with respect to the axis of rotation 11. Each of these vee-grooves 38a,b is formed from a pair of walls which intersect at an angle A, which is preferably 90° but may be as little as 40°. At its bottom end, the bearing surface 37 terminates in an annular wall 39. Together, this annular wall 39 and the bearing surface 37 define an annular recess 40 in the lockring 23 which is substantially complementary in shape to the two balancing rings 35a,b. As a result of such complementary dimensioning of the annular recess 40 and the balancing rings 35a,b, the balancing mechanism 33 is accommodated within the lockring 23 (which is preferably a standard conventional lockring) without significantly changing its shape or profile, which in turn advantageously provides a rotary tool assembly 1 whose dimensions fall within an industry standard tool envelope such as set by ANSI or ISO. The use of such an annular recess 40 in the lockring 23 further facilitates the retrofitting of the balancing mechanism 33 on a conventional tool assembly.

Figure 8:
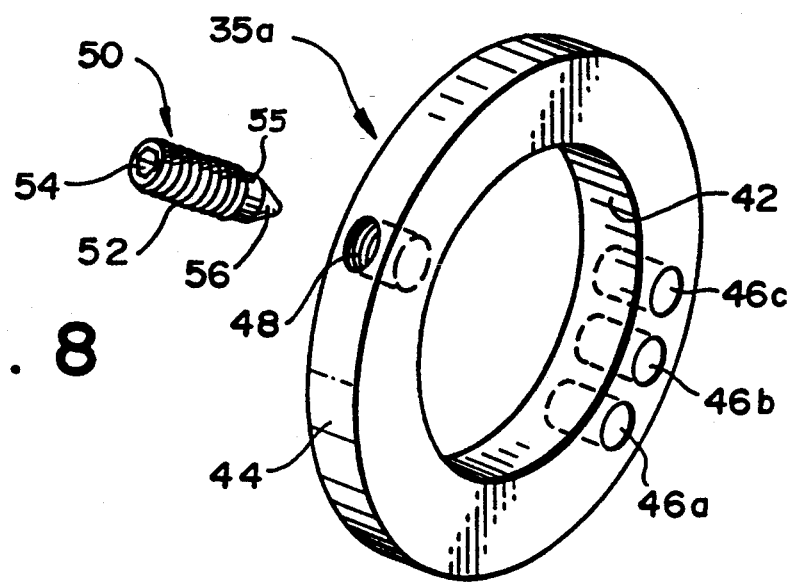
FIG. 8 is a perspective, exploded view of one of the balancing rings of the balancing mechanism and its respective set screw.

With reference now to FIGS. 5, 6, and 8, each of the balancing rings 35a,b includes an inner annular wall 42 which is slidably movable over the bearing surface 37 of the lockring 23 when a balancing adjustment of the rotary tool assembly 1 is desired. This inner annular wall 42 is frustro-conically shaped with respect to its axis of rotation 11, the taper angle T2 of this frustro-conical inner annular wall 42 being the same 2° to 7°.

taper as the previously discussed bearing surface 37 on the lockring 23. Preferably, this inner annular wall 42 is machined and polished to facilitate its manual rotation around the bearing surface 37 when an adjustment of the balancing mechanism 33 is desired. Each of the balancing rings 35a,b further has an outer annular wall 44. While not specifically shown, this outer annular wall 44 can include ridges or a roughened surface to facilitate the grasping and turning of the balancing rings 35a,b when balancing adjustments are made.

As is most evident in FIG. 8, each of the balancing rings 35a,b includes three or more annularly spaced apart bores 46a,b,c along one of its sides. The provision of these bores 46a,b,c causes the distribution of the mass around the circumference of the ring to be non-uniform, which thereby causes each of the rings 35a,b to apply an eccentric load on the rotary tool assembly 1 when the assembly 1 is rotated. The bores 46a,b,c present on both of the balancing rings 35a,b are carefully dimensioned such that each of the rings 35a,b applies exactly the same eccentric load to the rotary tool assembly 1 when the assembly is operated. Hence, when the three bores 46a,b,c on each of the two balancing rings 35a,b are turned 180° in opposition to one another, the net eccentric load that both rings 35a,b apply to the rotary tool assembly 1 as a whole is zero. Conversely, when the three bores 46a,b,c of each of the rings are aligned together, the two balancing rings 35a,b apply a double eccentric load to the rotary tool assembly 1 when it is rotated. Of course, one can obtain anywhere between zero and twice the eccentric load that can be applied to the rotary tool assembly by either of the balancing rings 35a,b by placing the three annular bores 46a,b,c in each of the rings 35a,b anywhere between zero and 180° in opposition. When the eccentric load applied by the rings 35a,b to the rotary tool assembly 1 is equal and opposite to whatever eccentric load might exist in the rotary tool assembly 1 due to an unbalanced condition, eccentric load in the rotary tool assembly 1 becomes neutralized, and the tool 1 becomes balanced.

Figure 7:
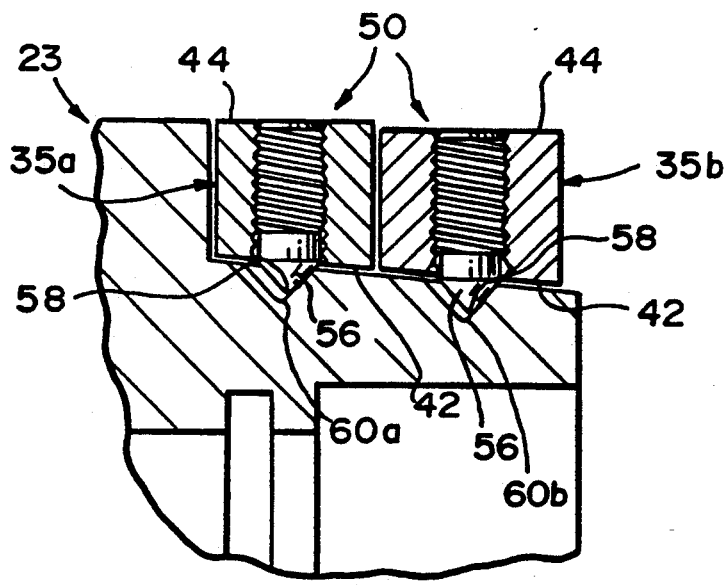
FIG. 7 is the enlarged view of the annular recess in the lockring illustrated in FIG. 4 with the balancing rings rotatably mounted therein.
Figure 9:
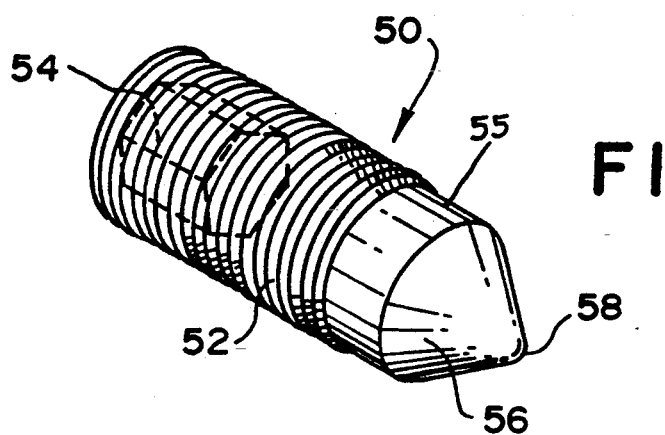
FIG. 9 is an enlarged perspective view of the balancing ring set screw illustrated in FIG. 8.

With respect now to FIGS. 7, 8 and 9, each of the balancing rings 35a,b includes a threaded bore 48 disposed 180° opposite from the centermost, mass-reducing bore 46b. This threaded bore 48 receives a set screw 50 having a threaded shank 52 throughout its middle portion, a hexagonal recess 54 at its outer most end, and an energy storing portion 55 and conical head 56 at its innermost end. The taper of the conical head 56 is approximately the same as the taper angle A of each of the vee-grooves 38a,b wherein A is preferably about 90°. Additionally, the tip 58 is preferably slightly rounded as shown in FIG. 9, while the nadir 60 of each of the vee-grooves 38a,b is likewise slightly rounded as best seen in FIG. 4. The rounding of the tips 58 of the set screws 50 and the nadirs 60 of the vee-grooves 38a,b, affords better engagement between the screws 50 and vee-grooves 38a,b over a wider amount of axial movement of the rings 35a,b with respect to the bearing surface 37.

In the method of the invention, the rotatable tool 17 desired to be used in conjunction with the assembly 1 is first installed in the bore 15 of a collet 13 as shown in FIG. 1. Next, the lockring 23 of the assembly 1 is rotated relative to the tool holder 3 such that the canted rollers 29 cause the lockring 23 to unscrew away from the bottommost portion of the lower end 9 of the tool holder housing 5. Such a retraction of the lockring 23 off of the lower end 9 of the tool holder housing 5 relieves the lower end 9 from the radially compressive forces that the lockring 23 normally applies to the housing 5, which thereby allows the walls of the cylindrical bore 12 to radially expand outwardly. The collet 13 is then inserted into the expanded bore 12, and the lockring 23 is turned so as to return it into the position illustrated in FIG. 1, which in turn radially contracts the walls of the cylindrical bore into tight frictional engagement around the outer surface of the collet 13.

Just before the lockring 23 is screwed upwardly into the position illustrated in FIG. 1, the set screws 50 of each of the balancing rings 35a,b are loosened enough so that each of the rings 35a,b can be freely manually rotated around the bearing surface 37, but not so much as to allow the conical heads 56 of these screws 50 to become completely disengaged from their respective vee-groove 38a,b which in turn would allow the rings 35a,b to possibly fall off of the lockring 23. After the lockring 23 has been screwed into the upper most position illustrated in FIG. 1, the balancing rings 35a,b are manually turned so that the three, mass reducing bores 46a,b,c present on each are 180° opposite one another. The set screws 50 of each are then turned inwardly to secure the balancing rings 35a,b in this position.

After the lockring 23 has been screwed into position illustrated in FIG. 1, the reactive forces applied by the cylindrical walls of the lower end 9 of the tool holder housing 5 to the walls of the lockring 23 causes a slight radial expansion of the lockring, which in turn causes the outer diameter of the bearing surface 37 to increase slightly. However, because the set screws 50 of each of the balancing rings 35a,b are in a loosened state at this time, and because the bearing surface 37 and the inner annular walls 42 of these rings 35a,b have a slight frustro-conical taper as heretofore described, the rings 35a,b will simply slide upwardly a short distance toward the conical upper end 50 of the tool holder 3 in response to this radial expansion. While such radial expansion of the bearing surface 37 may cause the tip 58 of the conical head 56 of each of the set screws 50 to become slightly out of alignment with the nadir 60 of its respective vee-groove 38a,b, the substantially complementary, 90° taper of the vee-groove walls and the conical heads 56 will allow the heads 56 of the set screws 50 to securely engage the right hand walls of their respective vee-grooves 38a,b as shown in FIG. 7. Such engagement securely fastens the balancing rings 35a,b at a desired angular position with respect to the axis of rotation 11 despite any such slight misalignment between the tips 58 of the set screws 50 and the nadirs 60 of the vee-grooves 38a,b.

In the next step of the method of the invention, the unbalance of the rotating mass system defined by the combination of tool holder 3, the collet 13, the rotatable tool 17, the lockring 23, and the balancing mechanism 33 (when set at a neutral position) is then determined. This may be achieved by means of a commercially available machine such as a Model No. MT-50 Tool Holder Balancer manufactured by American Hofmann. Such machines determine not only the magnitude of the eccentric load causing the unbalance, but also the angular position of the unbalancing eccentric load. In the next step of the method, the set screws 50 of the balancing rings 35a,b are loosened, and the balancing rings are then independently and manually rotated to an angular position that imposes an eccentric load on the rotary tool assembly 1 that is equal in magnitude, but opposite in angular position to the eccentric load causing the unbalanced condition in the assembly 1, thereby effectively neutralizing it and balancing the assembly 1. The set screws 50 are then screwed inwardly to secure the balancing rings 35a,b into the angular positions which desirably neutralize the angular unbalance in the assembly 1, as again shown in FIG. 7.

When the method of the invention is applied to a convention rotary tool assembly of the type including a conventional lockring 23, it further includes the steps of cutting an annular recess 40 around the upper end of the lockring 23, machining a slightly frustro-conically oriented bearing surface 37 having axially spaced vee-grooves 38a,b as previously described around the circumferential wall of this annular recess 40, and then installing balancing rings 35a,b over the bearing surface 37 prior to the step of installing a rotatable tool 17 in the housing 5 of the tool holder 3.

What is claimed is:

1. A rotary tool assembly comprising:
   (a) a rotary tool holder having an axis of rotation;
   (b) means for retaining a cutting tool in said holder that circumscribes said holder axis around its axis of rotation and which is detachably connectable thereto, said retaining means including a manually accessible outer surface;
   (c) a pair of balancing rings for balancing the entire rotary tool assembly, said rings being rotatably mounted around a portion of the outer surface of said retaining means so as to be manually angularly positionable around the axis of rotation of the tool holder, and
   (d) means for securing said balancing rings at a desired angular position with respect to said axis of rotation of said tool holder.

2. The rotary tool assembly of claim 1, wherein said rotary tool holder includes a recess at one end for receiving an end of said cutting tool, and said retaining means includes a lockring that circumscribes said rotary tool holder end for radially compressing said end with respect to said axis of rotation to contract said recess and retain the end of the cutting tool received there.

3. The rotary tool assembly of claim 1, wherein each of said balancing rings is rotatable independently of the other.

4. The rotary tool assembly of claim 2, wherein said retaining means also includes a collet receivable with said recess of said rotary tool holder.

5. A rotary tool assembly comprising:
   (a) a rotary tool holder having an axis of rotation;
   (b) means for retaining a cutting tool in said holder including a lockring means that circumscribes the axis of rotation of said holder and which is detachably connectable thereto;
   (c) a pair of axially spaced balancing rings for balancing the entire rotary tool assembly, said rings being rotatably mounted around a portion of the outer surface of said lockring means so as to be angularly positionable around the axis of rotation of the tool holder, and
   (d) means for securing said balance rings at a desired angular position with respect to said axis of rotation of said tool holder.

6. The rotary tool assembly of claim 5, wherein said outer surface portion of said lockring means is frustro-conically shaped, and said balancing rings are slidably movable along the taper of said frustro-conically shaped surface such that said balancing rings remain angularly positionable around said axis of rotation regardless of any radial expansion of said surface.

7. The rotary tool assembly of claim 6, wherein said securing means includes a pair of axially spaced grooves in said frustro-conically shaped surface, and a set screw threadedly engaged in each of said rings and having an end extendable into and engageable with one of said grooves.

8. The rotary tool assembly of claim 7, wherein said end of said set screw rotatably mounts its respective ring around said lockring and secures said ring at said desired angular position.

9. The rotary tool assembly of claim 8, wherein said grooves are vee-grooves, and the end of each set screw is conically shaped to accommodate said sliding, axial movement of said rings in response to radial expansion of said surface.

10. The rotary tool assembly of claim 9, wherein the angle of the taper of the vee-grooves is at least 40° with respect to a plan orthogonal to the axis of rotation of the tool holder, and the angle of the taper of the cons-shaped end of each set screw is substantially the same as the taper of its respective vee-groove.

11. The rotary tool assembly of claim 10, wherein each ring includes a threaded bore that is radially oriented with respect to the axis of rotation of said tool holder, and each set screw includes a threaded shank receivable within one of said bores.

12. The rotary tool assembly of claim 11, wherein said threaded shank of each of said set screws is compressible such that said screws continue to secure the respective rings at a selected angular position in their respective vee-grooves despite centrifugal loading of said rings.

13. The rotary tool assembly of claim 6, wherein the angle of the taper of said frustro-conical outer surface portion of said lockring means is between 2° and 7° with respect to the axis of rotation of the tool holder.

14. The rotary tool assembly of claim 6, wherein each of the balancing rings includes an inner, annular surface that is frustro-conically tapered at the same angle as said outer surface portion of said lockring means to facilitate a sliding movement thereon.

15. An improved rotary tool assembly of the type including a rotary tool holder having an axis of rotation, and a lockring means detachably connectable to the tool holder for retaining a cutting tool in the tool holder, wherein the improvement comprises: a pair of axially spaced balancing rings rotatably mounted around a portion of the outer surface of said lockring means for balancing the entire rotary tool assembly.

16. The improved rotary tool assembly of claim 15, wherein said rotary tool holder includes an opening for receiving said cutting tool, and said lockring means compressively reduces the size of the opening such that the walls defining said opening frictionally secure said cutting tool within said opening.

17. The improved rotary tool assembly of claim 16, wherein said outer surface portion of said lockring means is frustro-conically shaped, and said balancing rings are slidably movable along the taper of said frusto-conically shaped surface such that said balancing rings remain rotatable regardless of any radial expansion of said surface that occurs as a result of the compressive load said lockring means applies to said rotary tool holder.

18. The improved rotary tool assembly of claim 17, wherein said improvement further comprises means for rotatably mounting said balancing rings on said frustro-conical surface for securing said rings at a selected angular position with respect to the axis of rotation of said tool holder.

19. The improved rotary tool assembly of claim 18, wherein said rotatable mounting means includes a pair of axially spaced grooves in said frusto-conical surface, and one set screw associated with each of said rings for both rotatably securing said rings on said surface when said set screws are at a first position, and for securing said rings at a desired angular position when said set screws are in a second position.

20. The improved rotary tool assembly of claim 19, wherein said grooves are vee-grooves, and said set screws each have a conically-shaped end engageable within one of said vee-grooves.

21. The improved rotary tool assembly of claim 15, wherein said tool holder is of the type having a conically shaped end receivable into and securable with the walls of a conically-shaped recess of a drive tool.

22. The improved rotary tool assembly of claim 16, wherein said lockring includes a tubular end having outer annular wall that receives said lockring means, and an inner annular wall that defines said tool-receiving opening, and said lockring means radially compresses said outer annular wall to radially contract the size of the opening defined by the inner annular wall.

23. The improved rotary tool assembly of claim 20, wherein each set screw includes a compressive shank portion that allows the end of said screw to remain engaged with its respective vee groove despite the application of a centrifugal load on the ring associated with said screw.

24. A rotary tool assembly comprising:
(a) an elongated rotary tool holder having a tubular end that defines an opening for receiving a cutting tool, said holder being rotatable about its longitudinal axis;
(b) lockring means circumscribing said tubular end of said tool holder for compressively reducing the size of the tool receiving opening in order to secure a tool therein;
(c) a pair of axially-spaced balancing rings for balancing the entire rotary tool assembly, said rings being rotatably mounted around a portion of the outer surface of the lockring means, and
(d) means for securing said balancing rings at a desired angular position with respect to said longitudinal axis of said holder.

25. The rotary tool assembly of claim 24, wherein each of said balancing rings provides an eccentric mass with respect to the axis of rotation of said tool holder.

26. An improved method for balancing a tool holder assembly of the type including a rotary tool holder having an axis of rotation, and a means attachable to said tool holder for retaining a cutting tool in said holder, comprising the steps of:
(a) rotatably mounting a pair of balancing rings around an outside surface of said retaining means such that the axis of rotation of said rings is coincident with the axis of rotation of said holder;
(b) installing a cutting tool in said rotary tool holder;
(c) determining the amount of unbalance in the combination of the tool holder assembly after the cutting tool is installed;
(d) rotatably positioning the balancing rings until the unbalance in the tool holder assembly has been neutralized, and (e) securing said balancing rings in said neutralizing position.

27. The method defined in claim 26, wherein said retaining means is a lockring, and further including a step of forming a groove in said lockring for rotatably receiving said balancing rings.

28. The method defined in claim 27, wherein said groove is frustro-conically formed so that said balancing rings remain angularly positionable around said lockring regardless of any radial expansion said lockring undergoes.

* * * * *